US008675566B2

(12) United States Patent
Huttunen et al.

(10) Patent No.: US 8,675,566 B2
(45) Date of Patent: Mar. 18, 2014

(54) UNINTERRUPTED TRANSMISSION OF INTERNET PROTOCOL TRANSMISSIONS DURING ENDPOINT CHANGES

(75) Inventors: Pentti Kalevi Huttunen, Vancouver (CA); Gavin Malcolm McMillan, Maple Ridge (CA)

(73) Assignee: Digifonica (International) Limited, Vancouver, British Columbia (CA)

( * ) Notice: Subject to any disclaimer, the term of this patent is extended or adjusted under 35 U.S.C. 154(b) by 18 days.

(21) Appl. No.: 13/496,864

(22) PCT Filed: Sep. 17, 2009

(86) PCT No.: PCT/CA2009/001317
§ 371 (c)(1),
(2), (4) Date: Mar. 16, 2012

(87) PCT Pub. No.: WO2011/032256
PCT Pub. Date: Mar. 24, 2011

(65) Prior Publication Data
US 2012/0170574 A1    Jul. 5, 2012

(51) Int. Cl.
*H04W 4/00* (2009.01)
(52) U.S. Cl.
USPC ......... 370/328; 370/349; 455/422.1; 455/436
(58) Field of Classification Search
None
See application file for complete search history.

(56) References Cited

U.S. PATENT DOCUMENTS

| | | | |
|---|---|---|---|
| 4,916,491 A | 4/1990 | Katoh | |
| 4,992,971 A | 2/1991 | Hayashi | |

(Continued)

FOREIGN PATENT DOCUMENTS

| | | | |
|---|---|---|---|
| CA | 2249668 | 4/1999 | |
| EP | 1 389 862 A1 | 2/2004 | |

(Continued)

OTHER PUBLICATIONS

EPO, Supplementary European Search Report, dated Nov. 2, 2012, Application No. 07855436.7, corresponds to U.S. Appl. No. 12/517,026.

(Continued)

*Primary Examiner* — Anh-Vu Ly
*Assistant Examiner* — Gustavo Lopez-Vargas
(74) *Attorney, Agent, or Firm* — Knobbe, Martens, Olson & Bear LLP (57) ABSTRACT

A method apparatus and computer readable medium for facilitating uninterrupted transmission of internet protocol (IP) transmissions containing real time transport protocol (RTP) data during endpoint changes. When an IP transmission is received at the caller RTP port or the callee RTP port, a call record having a caller RTP port identifier or a callee RTP port identifier matching a destination port identifier in the IP transmission is located and when the destination port identifier in the IP transmission matches the caller RTP port identifier of the record, a source IP address identifier and source port identifier from the IP transmission are set as the caller IP address identifier and caller port identifier respectively of the record when the caller IP address identifier and caller port identifier do not match the source IP address identifier and source port identifier respectively and a received SSRC identifier in the IP transmission matches the caller SSRC identifier. When the destination port identifier in the IP transmission matches the callee RTP port identifier of the record, the source IP address identifier and source port identifier from the IP transmission are set as the callee IP address identifier and callee port identifier respectively of the record when the callee IP address identifier and callee port identifier do not match the source IP address identifier and source port identifier respectively and the received SSRC identifier in the IP transmission matches the callee SSRC identifier.

16 Claims, 6 Drawing Sheets

(56) References Cited

U.S. PATENT DOCUMENTS

| | | |
|---|---|---|
| 5,146,491 A | 9/1992 | Silver et al. |
| 5,247,571 A | 9/1993 | Kay et al. |
| 5,303,297 A | 4/1994 | Hillis |
| 5,359,642 A | 10/1994 | Castro |
| 5,425,085 A | 6/1995 | Weinberger et al. |
| 5,440,621 A | 8/1995 | Castro |
| 5,454,030 A | 9/1995 | de Oliveira et al. |
| 5,469,497 A | 11/1995 | Pierce et al. |
| 5,506,893 A | 4/1996 | Buscher et al. |
| 5,519,769 A | 5/1996 | Weinberger et al. |
| 5,559,871 A | 9/1996 | Smith |
| 5,590,133 A | 12/1996 | Billstrom et al. |
| 5,608,786 A | 3/1997 | Gordon |
| 5,621,787 A | 4/1997 | McKoy et al. |
| 5,633,913 A | 5/1997 | Talarmo |
| 5,661,790 A | 8/1997 | Hsu |
| 5,712,907 A | 1/1998 | Wegner et al. |
| 5,724,355 A | 3/1998 | Bruno et al. |
| 5,726,984 A | 3/1998 | Kubler et al. |
| 5,737,414 A | 4/1998 | Walker et al. |
| 5,751,961 A | 5/1998 | Smyk |
| 5,793,762 A | 8/1998 | Penners et al. |
| 5,799,072 A | 8/1998 | Vulcan et al. |
| 5,802,502 A | 9/1998 | Gell et al. |
| 5,825,863 A | 10/1998 | Walker |
| 5,828,740 A | 10/1998 | Khuc et al. |
| 5,838,682 A | 11/1998 | Dekelbaum et al. |
| 5,845,267 A | 12/1998 | Ronen |
| 5,850,433 A | 12/1998 | Rondeau |
| 5,864,610 A | 1/1999 | Ronen |
| 5,867,495 A | 2/1999 | Elliott et al. |
| 5,883,891 A | 3/1999 | Williams et al. |
| 5,889,774 A | 3/1999 | Mirashrafi et al. |
| 5,905,736 A | 5/1999 | Ronen et al. |
| 5,907,547 A | 5/1999 | Foladare et al. |
| 5,910,946 A | 6/1999 | Csapo |
| 5,915,005 A | 6/1999 | He |
| 5,923,659 A | 7/1999 | Curry et al. |
| 5,930,343 A | 7/1999 | Vasquez |
| 5,937,045 A | 8/1999 | Yaoya et al. |
| 5,940,598 A | 8/1999 | Strauss et al. |
| 5,953,504 A | 9/1999 | Sokal et al. |
| 5,956,391 A | 9/1999 | Melen et al. |
| 5,970,477 A | 10/1999 | Roden |
| 5,974,043 A | 10/1999 | Solomon |
| 5,991,291 A | 11/1999 | Asai et al. |
| 6,005,926 A | 12/1999 | Mashinsky |
| 6,014,379 A | 1/2000 | White et al. |
| 6,021,126 A | 2/2000 | White et al. |
| 6,052,445 A | 4/2000 | Bashoura et al. |
| 6,058,300 A | 5/2000 | Hanson |
| 6,069,890 A | 5/2000 | White et al. |
| 6,073,013 A | 6/2000 | Agre et al. |
| 6,078,647 A | 6/2000 | D'Eletto |
| 6,104,704 A | 8/2000 | Buhler et al. |
| 6,104,711 A | 8/2000 | Voit |
| 6,115,737 A | 9/2000 | Ely et al. |
| 6,128,304 A | 10/2000 | Gardell et al. |
| 6,137,869 A | 10/2000 | Voit et al. |
| 6,141,404 A | 10/2000 | Westerlage et al. |
| 6,151,385 A | 11/2000 | Reich et al. |
| 6,188,752 B1 | 2/2001 | Lesley |
| 6,282,574 B1 | 8/2001 | Voit |
| 6,298,062 B1 | 10/2001 | Gardell et al. |
| 6,351,464 B1 | 2/2002 | Galvin et al. |
| 6,359,880 B1 | 3/2002 | Curry et al. |
| 6,430,275 B1 | 8/2002 | Voit et al. |
| 6,507,644 B1 | 1/2003 | Henderson et al. |
| 6,597,686 B1 | 7/2003 | Smyk |
| 6,674,745 B1 | 1/2004 | Schuster et al. |
| 6,724,860 B2 | 4/2004 | Stumer et al. |
| 6,744,858 B1 | 6/2004 | Ryan et al. |
| 6,766,159 B2 | 7/2004 | Lindholm |
| 6,798,767 B1 | 9/2004 | Alexander et al. |
| 6,819,929 B2 | 11/2004 | Antonucci et al. |
| 6,954,453 B1 | 10/2005 | Schindler |
| 6,963,557 B2 | 11/2005 | Knox |
| 7,046,658 B1 | 5/2006 | Kundaje |
| 7,055,174 B1 | 5/2006 | Cope et al. |
| 7,068,772 B1 | 6/2006 | Widger et al. |
| 7,079,526 B1 | 7/2006 | Wipliez et al. |
| 7,120,682 B1 | 10/2006 | Salama |
| 7,212,522 B1 | 5/2007 | Shankar et al. |
| 7,454,510 B2 | 11/2008 | Kleyman et al. |
| 7,950,046 B2 | 5/2011 | Kropivny |
| 8,116,307 B1 | 2/2012 | Thesayi et al. |
| 2002/0051518 A1 | 5/2002 | Bondy et al. |
| 2002/0116464 A1 | 8/2002 | Mak |
| 2002/0122391 A1 | 9/2002 | Shalit |
| 2003/0200311 A1 | 10/2003 | Baum |
| 2003/0219103 A1 | 11/2003 | Rao et al. |
| 2004/0022237 A1 | 2/2004 | Elliot et al. |
| 2004/0157629 A1 | 8/2004 | Kallio et al. |
| 2004/0165709 A1 | 8/2004 | Pence et al. |
| 2004/0181599 A1 | 9/2004 | Kreusch et al. |
| 2004/0202295 A1 | 10/2004 | Shen et al. |
| 2004/0240439 A1 | 12/2004 | Castleberry et al. |
| 2004/0255126 A1 | 12/2004 | Reith |
| 2005/0025043 A1 | 2/2005 | Mussman et al. |
| 2005/0083911 A1 | 4/2005 | Grabelsky et al. |
| 2005/0094651 A1 | 5/2005 | Lutz et al. |
| 2005/0169248 A1 | 8/2005 | Truesdale et al. |
| 2005/0174937 A1 | 8/2005 | Scoggins et al. |
| 2005/0177843 A1 | 8/2005 | Williams |
| 2005/0198499 A1 | 9/2005 | Salapaka et al. |
| 2006/0072547 A1 | 4/2006 | Florkey et al. |
| 2006/0072550 A1 | 4/2006 | Davis et al. |
| 2006/0093135 A1 | 5/2006 | Fiatal et al. |
| 2006/0111116 A1 | 5/2006 | Palmer et al. |
| 2006/0153342 A1 | 7/2006 | Sasaki |
| 2006/0160565 A1 | 7/2006 | Singh et al. |
| 2006/0177035 A1 | 8/2006 | Cope et al. |
| 2006/0209768 A1 | 9/2006 | Yan et al. |
| 2006/0258328 A1 | 11/2006 | Godoy |
| 2006/0264200 A1 | 11/2006 | Laiho et al. |
| 2007/0036143 A1 | 2/2007 | Alt et al. |
| 2007/0112964 A1 | 5/2007 | Guedalia et al. |
| 2007/0127676 A1 | 6/2007 | Khadri |
| 2007/0253418 A1 | 11/2007 | Shiri et al. |
| 2008/0037715 A1 | 2/2008 | Prozeniuk et al. |
| 2008/0056235 A1 | 3/2008 | Albina et al. |
| 2008/0056302 A1* | 3/2008 | Erdal et al. .......... 370/474 |
| 2008/0063153 A1 | 3/2008 | Krivorot et al. |
| 2009/0028146 A1 | 1/2009 | Kleyman et al. |
| 2009/0135735 A1* | 5/2009 | Zhang et al. .......... 370/253 |
| 2009/0141883 A1* | 6/2009 | Bastien .......... 379/213.01 |
| 2009/0292539 A1 | 11/2009 | Jaroker |
| 2009/0325558 A1 | 12/2009 | Pridmore et al. |
| 2010/0086119 A1 | 4/2010 | De Luca et al. |
| 2010/0128729 A1* | 5/2010 | Yazaki et al. .......... 370/392 |
| 2012/0099599 A1* | 4/2012 | Keranen et al. .......... 370/392 |
| 2012/0227101 A1* | 9/2012 | Yuan .......... 370/352 |
| 2013/0114589 A1* | 5/2013 | Fangman et al. .......... 370/352 |

FOREIGN PATENT DOCUMENTS

| | | |
|---|---|---|
| EP | 1 389 862 B1 | 11/2004 |
| WO | WO 01/89145 A2 | 11/2001 |
| WO | WO 2007/044454 A2 | 4/2007 |
| WO | WO 2008/052340 A1 | 5/2008 |
| WO | WO 2008/064481 A1 | 6/2008 |
| WO | WO 2008/116296 A1 | 10/2008 |

OTHER PUBLICATIONS

F. Baker et al. "RFC 3924—Cisco Architecture for Lawful Intercept in IP Networks." Oct. 2004.
Cisco. "Lawful Intercept Requirements Summary." http://www.faqs.org/rfcs/rfc3924.html. Nov. 8, 2006.
Sippy SIP B2BUA. "About Sippy RTPproxy." http://www.rtpproxy.org. Jul. 15, 2009.
ETSI Technical Specification. "Lawful Interception (LI); Handover Interface and Service-Specific Details (SSD) for IP delivery; Part 5:

(56) References Cited

OTHER PUBLICATIONS

Service-specific details for IP Multimedia Services." Apr. 2008, 25 pgs, v.2.3.1, France.
M. Handley et al. "RFC 2543—SIP: Session Initiation Protocol." Mar. 1999.
International Search Report and Written Opinion of the International Searching Authority completed Jun. 6, 2008 for related PCT/CA2008/000545.
International Search Report and Written Opinion of the International Searching Authority completed Feb. 6, 2008 for corresponding PCT/CA2007/001956.
International Preliminary Report on Patentability mailed May 14, 2009 for corresponding PCT/CA2007/001956.
International Search Report and Written Opinion of the International Searching Authority completed Mar. 3, 2008 for related PCT/CA2007/002150.
International Preliminary Report on Patentability mailed Feb. 13, 2009 for related PCT/CA2007/002150.
International Preliminary Report on Patentability and Written Opinion of the International Searching Authority mailed Feb. 10, 2011 for related PCT Application No. PCT/CA2009/001062, Feb. 1, 2011.
Written Opinion and International Search Report completed on Jun. 18, 2010 for related PCT Application No. PCT/CA2009/001317.
International Search Report and Written Opinion mailed on Mar. 12, 2010 for corresponding PCT Application No. PCT/CA2009/001062.
International Preliminary Report on Patentability issued on Sep. 29, 2009 for PCT/CA2008/000545.
International Preliminary Report on Patentability issued on Mar. 20, 2012 for PCT/CA2009/001317.
Townsley, et al.; "RFC 2661—Layer Two Tunneling Protocol 'L2TP'", Aug. 1999.
IP2Location, http://www.ip2location.com/; printed Jun. 20, 2012.
DOTS IP Address Validation, "Overview", http://www.serviceobjects.com/products/dots_ipgeo.asp; printed Jun. 21, 2012.
List of North American Numbering Plan area codes, http://en.wikipedia.org/wiki/List_of_NANP_area_codes; printed Jun. 20, 2012.
DOTS Phone Exchange, "Overview", http://www.serviceobjects.com/demos/PhoneExchangeDemo.asp (URL no longer valid, current URL is http://www.serviceobjects.com/products/phone/phone-exchange); printed Jun. 21, 2012.
Rosenberg, et al.; "RFC 3261—SIP: Session Initiation Protocol", Jun. 2002.
Lind AT&T S: "ENUM Call Flows for VoIP Interworking; draft-lind-enum-callflows-03.txt", No. 3, Feb. 1, 2002, pp. 1-17.
IETF ENUM WG R STASTNY OEFEG Informational Numbering for VOIP and Other IP Communications: "Numbering for VoIP and other IP Communications, draft-stastny-enum-numbering-voip-00.txt", Oct. 1, 2003, pp. 1-43.
Supplementary European Search Report for European Application No. 07816106 dated Jun. 18, 2012.
International Search Report from PCT/CA2009/001317 dated Jun. 18, 2010.
Wikipedia, "International mobile subscriber identity (IMSI)," http://en.wikipedia.org/wiki/IMSI, Jul. 16, 2013.
Wikipedia, "Roaming," http://en.wikipedia.org/wiki/Roaming, Jul. 16, 2013.
Extended European Search Report dated Dec. 20, 2013 for European Patent Application No. EP 09 849 358.8 which shares priority of International Application No. PCT/CA2009/001317 with captioned U.S. Appl. No. 13/496,864.

* cited by examiner

Session Information

CALLER RTP port: R 22125
CALLER RTCP port: Optional
CALLEE RTP port: E 22123
CALLEE RTCP port: Optional CALLER Information CALLER IP Address: 192.168.0.20
CALLER UDP Port No.: 12345
CALLER Sync Source (SSRC):
Packets Sent:
Packets Received: 1 —— 136

CALLEE Information

CALLEE IP Address: 192.168.3.10
CALLEE UDP Port No.: 33123
CALLEE Sync Source (SSRC):
Packets Sent:
Packets Received:

FIG. 6

Session Information

CALLER RTP port: R  22125
CALLER RTCP port: Optional
CALLEE RTP port: E  22123
CALLEE RTCP port: Optional

CALLER Information

CALLER IP Address: 192.168.0.20
CALLER UDP Port No.: 12345
76 — CALLER Sync Source (SSRC): $SSRC_R$ — 146
Packets Sent:
Packets Received: 1

CALLEE Information

CALLEE IP Address: 192.168.3.10
CALLEE UDP Port No.: 33123
CALLEE Sync Source (SSRC):
Packets Sent:
Packets Received:

FIG. 7

Session Information

CALLER RTP port: R  22125
CALLER RTCP port: Optional
CALLEE RTP port: E  22123
CALLEE RTCP port: Optional

CALLER Information

CALLER IP Address: 192.168.0.30
CALLER UDP Port No.: 33333
CALLER Sync Source (SSRC): $SSRC_R$
Packets Sent:
Packets Received: 2

CALLEE Information

CALLEE IP Address: 192.168.3.10
CALLEE UDP Port No.: 33123
CALLEE Sync Source (SSRC):
Packets Sent:
Packets Received:

UNINTERRUPTED TRANSMISSION OF INTERNET PROTOCOL TRANSMISSIONS DURING ENDPOINT CHANGES

BACKGROUND OF THE INVENTION

1. Field of Invention

This invention relates to internet protocol (IP) transmissions and, more particularly, to uninterrupted transmission of IP transmissions containing real time transport protocol (RTP) data during endpoint changes.

2. Description of Related Art

Internet Protocol (IP) transmission systems are known to use media relays to relay IP transmissions from one endpoint to another. In a telephone system, the media relay relays IP transmissions between a caller and a callee. An IP session is established by a call controller, which interacts with the media relay, the caller and the callee to convey to each of these entities the IP addresses and ports to which they should send IP transmissions and from which they should expect IP transmissions. The media relay is configured to accept packets conveyed by IP transmissions from specified caller and callee IP addresses and ports. In some systems, such as mobile telephone systems, a mobile telephone may be in communication with a first base station while in a certain geographical area and there may be a handoff of the call to another base station when the mobile telephone is moved to a different geographical location. Communications between the base stations and the mobile telephones are conducted on a Global System from Mobile Communication (GSM) network or other cellular network, for example, and the base stations convert messages to and from the GSM network and the IP network and thus, the base stations establish the caller and callee IP addresses and ports. Each base station will have a unique IP address and UDP port number that it associates or assigns to the mobile telephone with which it has established communication in the conventional manner over the cellular network. Thus, a conventional media relay will reject IP streams from the new base station after handoff of the call because such streams are seen as being transmitted by an unauthorized source. This generally prevents voice over IP telephone calls from being made through systems that employ media relays without further call handling.

The Session Initiation Protocol (SIP) RFC 3261 provided by the Internet Engineering Task Force (IETF) specifies a mechanism for an endpoint to notify another endpoint if its IP address changes. This mechanism employs a signaling message that conveys an identification of new media properties for the endpoint whose IP address has changed. The use of SIP messages for this purpose, however, adds extra overhead and delays to the call as signaling messages must be routed through the call controller and the call controller must communicate with the media relay and endpoints to re-configure the media relay to accept IP transmissions from the endpoint having the new IP address and to cause IP transmission to be relayed thereto each time a handoff occurs.

SUMMARY OF THE INVENTION

In accordance with one aspect of the invention, there is provided a method for facilitating uninterrupted transmission of internet protocol (IP) transmissions containing real time transport protocol (RTP) data during endpoint changes. The method involves maintaining records, each record associating session information, caller information and callee information for IP communication sessions. The session information includes caller and callee RTP port identifiers identifying caller and callee RTP ports respectively of a media relay. The caller information includes a caller IP address identifier and a caller port identifier to which IP transmissions received at the callee RTP port are transmitted from the media relay, and a caller synchronization source (SSRC) identifier. The callee information includes a callee IP address identifier and a callee port identifier to which IP transmissions received at the caller RTP port are transmitted from the media relay, and a callee SSRC identifier. When an IP transmission is received at the caller RTP port or the callee RTP port, the record having a caller RTP port identifier or a callee RTP port identifier matching a destination port identifier in the IP transmission is located. When the record is located and when the destination port identifier in the IP transmission matches the caller RTP port identifier of the record, a source IP address identifier and source port identifier from the IP transmission are set as the caller IP address identifier and caller port identifier respectively of the record when the caller IP address identifier and caller port identifier do not match the source IP address identifier and source port identifier respectively and a received SSRC identifier in the IP transmission matches the caller SSRC identifier. When the destination port identifier in the IP transmission matches the callee RTP port identifier of the record, the source IP address identifier and source port identifier from the IP transmission are set as the callee IP address identifier and callee port identifier respectively of the record when the callee IP address identifier and callee port identifier do not match the source IP address identifier and source port identifier respectively and the received SSRC identifier in the IP transmission matches the callee SSRC identifier.

The method may involve determining whether the IP transmission is a pre-determined transmission and, if so, determining whether the IP transmission is from the caller or callee. When the pre-determined IP transmission is received from the caller, the method involves storing the received SSRC identifier as the caller SSRC identifier in the record and when the pre-determined IP transmission is received from the callee, the method involves storing the received SSRC identifier as the callee SSRC identifier in the record.

The method may involve determining whether the IP transmission is a pre-determined transmission and, if so, where the caller and callee are configured to use the same SSRC identifier, storing the received SSRC identifier as the caller SSRC identifier in the record and as the callee SSRC identifier in the record.

The method may involve causing the media relay to forward the IP transmission to the callee at the callee IP address and callee UDP port identified by the callee IP address identifier and callee UDP port identifier of the record and identifying the source of the IP transmission forwarded to the callee with the callee RTP port identifier when the IP transmission was received at the caller RTP port, and causing the media relay to forward the IP transmission to the caller at the caller IP address and caller UDP port identified by the caller information of the record and identifying the source of the IP transmission forwarded to the caller with the caller RTP port identifier when the IP transmission was received at the callee RTP port.

In accordance with another aspect of the invention, there is provided a media relay apparatus for facilitating uninterrupted transmission of internet protocol (IP) transmissions containing real time transport protocol (RTP) data during endpoint changes. The apparatus includes a processor, input/output interfaces in communication with the processor to provide for physical connection to an IP network, program memory and storage memory. The program memory is encoded with codes for directing the processor to:

provide a logical input/output interface interacting with the input/output interfaces to define caller and callee RTP ports;

maintain call records in the storage memory, each call record having fields associating session information, caller information and callee information for IP communication sessions, the fields associating session information including caller and callee RTP port identifier fields identifying the caller and callee RTP ports respectively; and the caller information including a caller IP address identifier field and a caller port identifier field to which IP transmissions received at the callee RTP port are to be transmitted, and a caller synchronization source (SSRC) identifier field, and the callee information including a callee IP address identifier field and a callee port identifier field to which IP transmissions received at the caller RTP port are to be transmitted, and a callee SSRC identifier field.

The codes further direct the processor to identify one of the records having the caller RTP port identifier field contents or the callee RTP port identifier field contents matching a destination port identifier in the IP transmission when an IP transmission is received at the caller RTP port or the callee RTP port.

When such a record is respectively located and when the destination port identifier in the IP transmission matches the contents of the caller RTP port identifier field of the record, the codes direct the processor to store a source IP address identifier and source port identifier from the IP transmission in the caller IP address identifier field and caller port identifier field respectively when the contents of the caller IP address identifier field and caller port identifier field do not match the source IP address identifier and source port identifier respectively and a received SSRC identifier in the IP transmission matches the contents of the caller SSRC identifier field.

When the destination port identifier in the IP transmission matches the contents of the callee RTP port identifier field of the record, the codes direct the processor to store the source IP address identifier and source port identifier from the IP transmission in the callee IP address identifier field and callee port identifier field respectively when the contents of the callee IP address identifier field and the callee port identifier field do not match the source IP address identifier and source port identifier respectively and the received SSRC identifier in the IP transmission matches the contents of the callee SSRC identifier field.

The program memory may be further encoded with codes for directing the processor to determine whether the IP transmission is a pre-determined transmission and, if so, determine whether the IP transmission is from the caller or callee and when the pre-determined IP transmission is received from the caller, store the received SSRC identifier in the caller SSRC identifier field in the record and when the pre-determined IP transmission is received from the callee, store the received SSRC in the callee SSRC identifier field in the record.

The program memory may be further encoded with codes for directing the processor to determine whether the IP transmission is a pre-determined transmission and, if so, where the caller and callee are configured to use the same SSRC, store the received SSRC in the caller SSRC identifier field in the record and in the callee SSRC identifier field in the record.

The program memory may be further encoded with codes for directing the processor to:

when the IP transmission is received at the caller RTP port, forward the IP transmission to the callee identified by the contents of the callee IP address identifier field and the callee port identifier field and identify the source of the IP transmission according to the contents of the callee RTP port identifier field; and when the IP transmission is received at the callee RTP port, forward the IP transmission to the caller identified by the contents of the caller IP address identifier field and the caller port identifier field and identify the source of the IP transmission according to the contents of the caller RTP port identifier field.

In accordance with another aspect of the invention, there is provided a media relay apparatus for facilitating uninterrupted transmission of internet protocol (IP) transmissions containing real time transport protocol (RTP) data during endpoint changes. The media relay apparatus includes a processor, physical connection provisions for providing physical connections between the processor and an IP network, provisions interacting with the physical connection provisions and the processor for providing a logical input/output interface defining caller and callee RTP ports. The apparatus further includes provisions for maintaining call records in memory, each of the call records having provisions for associating session information, caller information and callee information for IP communication sessions. These provisions include provisions for storing caller and callee RTP port identifiers identifying the caller and callee RTP ports respectively, provisions for storing a caller IP address identifier and a caller port identifier to which IP transmissions received at the callee RTP port are to be transmitted, provisions for storing a caller synchronization source (SSRC) identifier, provisions for storing a callee IP address identifier and a callee port identifier to which IP transmissions received at the caller RTP port are to be transmitted, and provisions for storing a callee SSRC identifier. The apparatus further includes provisions for identifying one of the records having a caller RTP port identifier or a callee RTP port identifier matching a destination port identifier in the IP transmission when an IP transmission is received at the caller RTP port or the callee RTP port. The apparatus further includes provisions for determining whether the destination port identifier in the IP transmission matches the caller RTP port identifier of the record. The apparatus further includes provisions for setting the caller IP address identifier and caller port identifier as the source IP address identifier and source port identifier respectively from the IP transmission when the caller IP address identifier and caller port identifier do not match the source IP address identifier and source port identifier respectively and a received SSRC identifier in the IP transmission matches the contents of the caller SSRC identifier and the destination port identifier in the IP transmission matches the caller RTP port identifier of the record. The apparatus further includes provisions for determining whether the destination port identifier in the IP transmission matches the callee RTP port identifier of the record and provisions for setting the callee IP address identifier and callee port identifier as the source IP address identifier and source port identifier respectively from the IP transmission when the callee IP address identifier and the callee port identifier do not match the source IP address identifier and source port identifier respectively and the received SSRC identifier in the IP transmission matches the contents of the callee SSRC identifier and the destination port identifier in the IP transmission matches the callee RTP port identifier of the record.

The apparatus may further include provisions for determining whether the IP transmission is a pre-determined transmission and, if so, determining whether the IP transmission is from the caller or callee and provisions for storing the received SSRC identifier as the caller SSRC identifier when the pre-determined IP transmission is received from the caller and provisions for storing the received SSRC identifier as the callee SSRC identifier when the pre-determined IP transmission is received from the callee.

The apparatus may further include provisions for determining whether the IP transmission is a pre-determined transmission and provisions for storing the received SSRC identifier as the caller SSRC identifier and as the callee SSRC identifier where the caller and callee are configured to use the same SSRC.

The apparatus may further include provisions for forwarding the IP transmission to the callee identified by the callee IP address identifier and the callee port identifier and for identifying the source of the IP transmission with the callee RTP port identifier when the received IP transmission was received at the caller RTP port and provisions for forwarding the IP transmission to the caller identified by the caller IP address identifier and caller port identifier and for identifying the source of the IP transmission with the caller RTP port identifier when the received IP transmission was received at the callee RTP port.

In accordance with another aspect of the invention, there is provided a computer readable medium encoded with codes for directing a processor of a media relay to facilitate uninterrupted transmission of internet protocol (IP) transmissions containing real time transport protocol (RTP) data during endpoint changes, the codes comprising codes for directing the processor to:

maintain records, each record associating session information, caller information and callee information for IP communication sessions;

the session information including caller and callee RTP port identifiers identifying caller and callee RTP ports respectively of the media relay;

the caller information including a caller IP address identifier and a caller port identifier to which IP transmissions received at the callee RTP port are transmitted from the media relay, a caller synchronization source (SSRC) identifier; and         the callee information including a callee IP address identifier and a callee port identifier to which IP transmissions received at the caller RTP port are transmitted from the media relay, a callee SSRC identifier; and     when an IP transmission is received at the caller RTP port or the callee RTP port:

identify one of the records having the caller RTP port identifier or the callee RTP port identifier matching a destination port identifier in the IP transmission;

when the record is identified and when the destination port identifier in the IP transmission matches the caller RTP port identifier of the record,         set a source IP address identifier and source port identifier from the IP transmission as the caller IP address identifier and caller port identifier respectively of the record when:

the caller IP address identifier and caller port identifier do not match the source IP address identifier and source port identifier respectively; and         a received SSRC identifier in the IP transmission matches the caller SSRC identifier; and         when the record is identified and when the destination port identifier in the IP transmission matches the callee RTP port identifier of the record,         set the source IP address identifier and source port identifier from the IP transmission as the callee IP address identifier and callee port identifier respectively of the record when:

the callee IP address identifier and callee port identifier do not match the source IP address identifier and source port identifier respectively; and         the received SSRC identifier in the IP transmission matches the callee SSRC identifier.

The computer readable medium may further include codes for directing the processor to determine whether the IP transmission is a pre-determined transmission and, if so, determine whether the IP transmission is from the caller or callee and when the pre-determined IP transmission is received from the caller, store the received SSRC identifier as the caller SSRC identifier in the record and when the pre-determined IP transmission is received from the callee, store the received SSRC identifier as the callee SSRC identifier in the record.

The computer readable medium may further include codes for directing the processor to determine whether the IP transmission is a pre-determined transmission and, if so, where the caller and callee are configured to use the same SSRC, store the received SSRC identifier as the caller SSRC identifier in the record and as the callee SSRC identifier in the record.

The computer readable medium may further include codes for directing the processor to:

if the IP transmission was received at the caller RTP port, cause the media relay to forward the IP transmission to the callee at the callee IP address and callee UDP port identified by the callee IP address identifier and callee UDP port identifier and identify the source of the IP transmission forwarded to the callee with the callee RTP port identifier; and     if the IP transmission was received at the callee RTP port, cause the media relay to forward the IP transmission to the caller at the caller IP address and caller UDP port identified by the caller IP address identifier and caller UDP port identifier and identify the source of the IP transmission forwarded to the caller with the caller RTP port identifier.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
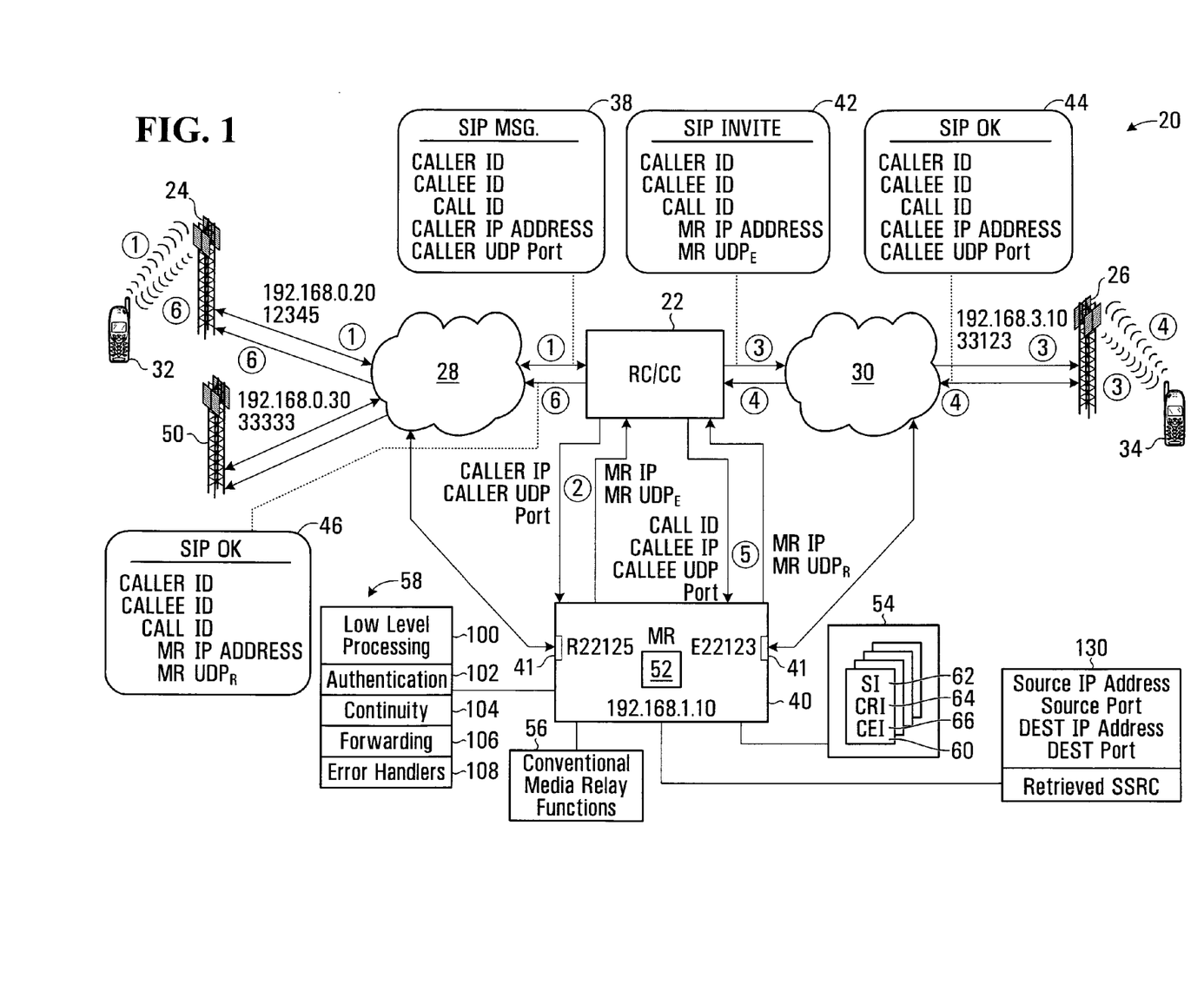
FIG. 1 is a schematic diagram illustrating a system for facilitating uninterrupted transmission of internet protocol (IP) transmissions containing real time transport protocol (RTP) data during endpoint changes, according to a first embodiment of the invention.

Referring to FIG. 1, a system for handling voice over internet protocol (IP) transmissions and more generally, IP transmissions, is shown generally at 20. The system 20 includes a routing controller/call controller (RC/CC) system 22 and first, second and third base stations 24, 26 and 50. The base stations 24, 26 and 50 are operable to communicate with the RC/CC 22 via a network or, as shown in this embodiment, separate networks 28 and 30, which in this embodiment depict the internet. The first and second base stations 24 and 26 in this embodiment are operable to communicate with caller and callee mobile telephones 32 and 34 respectively using a cellular wireless network in a conventional manner as is known in the art. The first and second base stations 24 and 26 thus act as "endpoints" for IP transmissions between the caller and callee.

Generally, to establish a call from the caller mobile telephone 32 to the callee mobile telephone 34, the caller mobile telephone transmits to the first base station 24 a session initiation protocol (SIP) message shown generally at 38. The SIP message 38 is transmitted from the caller mobile telephone 32 to the base station 24 and the first base station 24 formats the SIP message 38 into an IP transmission and transmits the IP transmission through the internet 28 to the RC/CC 22. In this embodiment, the first base station 24 is preconfigured with a network IP address 192.168.0.20 and universal datagram protocol (UDP) port 12345.

In response to receipt of the SIP message 38, the RC/CC 22 communicates with a media relay 40 and sends the caller IP address identifier and caller UDP port identifier contained in the SIP message to the media relay 40 to identify the IP address and UDP port to which the media relay 40 should send communications to the first base station 24 for receipt by the caller mobile telephone 32.

The media relay 40 has input/output interfaces 41 in communication with the processor to provide for physical connection to an IP network such as the internet. The media relay 40 is programmed to provide a logical input/output interface that interacts with the input/output interfaces 41 to define caller and callee real time transport protocol (RTP) ports in the conventional manner.

In response, the media relay 40 is configured to send a media relay IP address identifier and media relay RTP port identifier that it associates with the callee identified by the contents of the callee ID field in the SIP message 38. The media relay 40 sends this information to the RC/CC 22 to essentially inform the RC/CC 22 of the media relay IP address identifier and callee RTP port identifier that it should convey to the callee mobile telephone 34 so that the callee telephone can cause IP transmissions to be sent from the second base station 26 to the media relay 40 which can then subsequently forward those transmissions to the caller mobile telephone 32.

In response to receipt of the media relay IP address identifier and the callee RTP port identifier designated by the media relay 40, the RC/CC 22 transmits a SIP invite message 42 through the internet 30 to the callee mobile telephone 34 through the second base station 26. In this embodiment, the second base station 26 has an IP address (192.168.3.10) and a UDP port number (33123). Thus, the RC/CC 22 directs this SIP invite message 42 to the IP address and UDP port associated with the callee mobile telephone 34 by the second base station 26. The second base station 26 then communicates this SIP invite message 42 to the callee mobile telephone 34 over the wireless network and the callee mobile telephone 34 returns a SIP okay message 44 to the second base station 26.

The SIP okay message format is shown at 44 and includes a caller identifier (ID), a callee ID, a call ID, a callee IP address identifier and a callee UDP port identifier. The callee IP address identifier is the IP address of the second base station 26 and the callee UDP port identifier is the UDP port identifier associated with the callee mobile telephone 34 by the second base station 26. The second base station 26 sends the SIP okay message 44 in an IP transmission through the internet 30 to the RC/CC 22 which communicates the call ID, callee IP address identifier, and callee UDP port identifier contained in the SIP okay message 44 to the media relay 40 to identify to the media relay the IP address and UDP port associated with the callee. In response, the media relay 40 sends a reply message to the RC/CC 22 containing a media relay IP address identifier and caller RTP port identifier of a caller RTP port assigned by the media relay, to which the first base station 24 should direct IP transmissions to the media relay for receipt by the callee mobile telephone 34. In this embodiment, this message includes a media relay IP address identifier of 192.168.1.10 and a caller RTP port identifier (R22125).

The RC/CC 22 transmits a SIP okay message 46, having a format as shown, through the internet 28 to the first base station 24 and the first base station communicates the media relay IP address identifier and the caller RTP port identifier associated with the caller to the caller mobile telephone 32.

The above basic communications for establishing a call between the caller and callee mobile telephones 32 and 34 are described in further detail in Applicant's related International Application No. PCT/CA2007/002150. Of interest in connection with the present invention is the following way in which the media relay 40 is configured to permit the caller mobile telephone 32 to move to another geographical location in which a handoff occurs between the first base station 24 and the third base station 50 having an IP address identifier and UDP port identifier different from that of the first base station 24.

When a handoff from the first base station 24 to the third base station 50 occurs, the caller mobile telephone 32 ceases communication with the first base station 24 and establishes communication with the third base station 50. However, since the third base station 50 has a different IP address identifier and UDP port identifier than the first base station 24, the media relay 40 will receive IP transmissions from the third base station 50 identifying the source of the transmissions with a different IP address identifier and UDP port identifier than those associated with the first base station. Normally, the media relay 40 would reject such communications as being from an unknown source, however, due to the configuration of the media relay described below, IP transmissions from the third base station 50 are not rejected and the call can continue uninterrupted. To facilitate this, the media relay 40 is configured with additional functionality beyond that which merely relays communications between the caller and callee.

It is known that in general, a media relay 40 includes a processor 52, memory 54 operable to be written to and read by the processor 52, and program memory 56 containing codes readable by the processor 52 that define program instructions for directing the processor 52 to carry out conventional media relay functions for transferring IP transmissions between the caller and the callee. In order to provide the functionality of the present invention, in this embodiment, the media relay 40 is further configured with additional codes shown generally at 58 that direct the processor 52 to carry out the functionality described below and include functionality for configuring the memory 54 to include call records 60.

These additional codes 58 may be stored on a computer readable medium such as a CD-ROM, flash drive, or in memory at a remotely located computer and may be downloaded to the program memory 56 or the media relay 40 in a conventional manner, for example.

Figure 2:
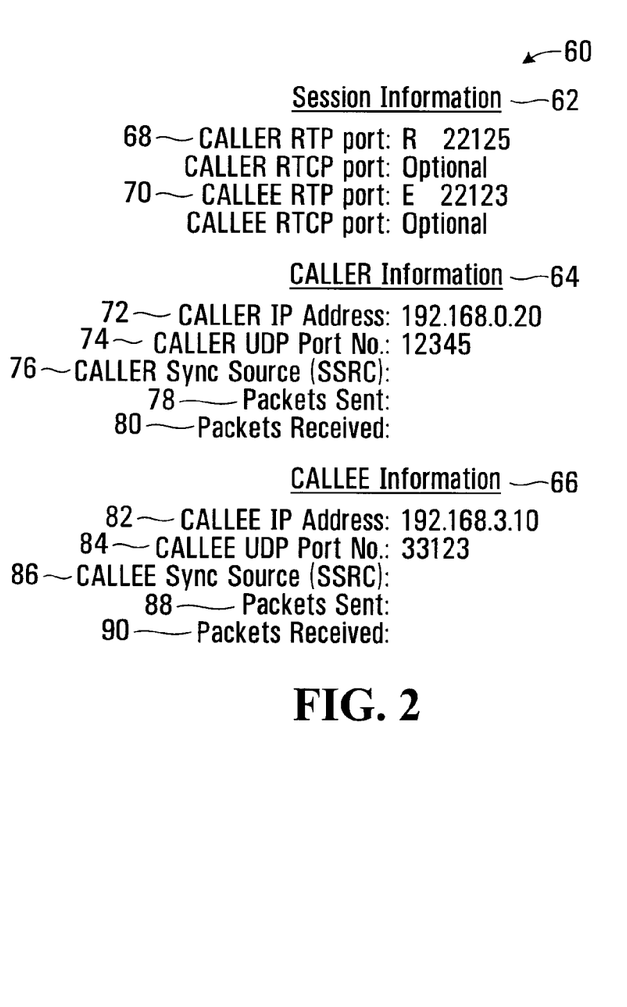
FIG. 2 is a tabular representation of a call record used by the system shown in FIG. 1.

Referring to FIG. 2, an exemplary call record is shown generally at 60. Each call record associates session information 62, caller information 64 and callee information 66 for an IP communication session (i.e. call) handled by the media relay 40. The session information 62 includes caller and callee RTP port identifier fields 68 and 70 for storing caller and callee RTP port identifiers identifying caller and callee RTP ports respectively of the media relay 40. In this embodiment, the caller RTP port identifier is R22125 and the callee RTP port identifier is E22123. The session information 62 may also include a caller RTCP port identifier field and a callee RTCP port identifier field, however, these are optional.

The caller information 64 includes a caller IP address identifier field 72 and a caller UDP port identifier field 74 that hold a caller IP address identifier and caller port UDP identifier to which IP transmissions received at the callee RTP port are to be transmitted. In this embodiment, the caller IP address identifier is 192.168.0.20 and the caller UDP port identifier is 12345 and correspond to those of the first base station 24, i.e. that associated with the caller. The caller information 64 further includes a caller sync source (SSRC) identifier field 76 for storing a caller sync source identifier associated with the caller side of the IP communication session. In one embodiment, until a pre-determined packet such as a first packet, for example, is received in connection with the call, this caller SSRC identifier is undefined.

In the embodiment shown, the caller information 64 further includes a packets sent field 78 and a packets received field 80 for holding numbers representing the number of packets sent to and received respectively from the caller although these fields are optional and the contents of these fields may be available from other functions on the media relay 40.

Referring to FIG. 2, the callee information 66 includes a callee IP address identifier field 82 and a callee UDP port identifier field 84 that hold a callee IP address identifier and callee UDP port identifier identifying a callee address and UDP port to which IP transmissions received at the caller RTP port are to be transmitted. In this embodiment, the callee IP address identifier is 192.168.3.10 and the callee UDP port identifier is 33123 and correspond to those of the second base station 26, i.e. that associated with the callee. The callee information 66 also includes a callee sync source (SSRC) identifier field 86 for storing a callee sync source identifier associated with the callee side of the IP communication session. In one embodiment, this callee SSRC identifier field 86 may be unpopulated until a predefined packet such as the first packet, for example, of the IP transmissions associated with the call is received.

In this embodiment, the callee information 66 also includes a packets sent field 88 and a packets received field 90 for storing numbers indicating the number of packets sent to and received from the caller. The call record 60 is populated with the information shown in FIG. 2 during the course of the normal message exchanges between the RC/CC 22, the caller and callee and the media relay 40 described above that communicate to the caller and callee the media relay IP address and respective RTP port identifiers (R22125 and E22123) to which communications are to be sent.

Referring back to FIG. 1, the additional codes 58 for directing the processor 52 of the media relay 40 to carry out the functions that facilitate uninterrupted transmissions of IP transmissions include codes 100 for effecting a low level processing routine, codes 102 for effecting an authentication routine, codes 104 for effecting a continuity routine, codes 106 for effecting a forwarding routine and codes 108 for effecting error handler routines. The functionality of the low level processing routine codes 100 is not shown but generally relates to processing associated with layers 0 to 4 of the 7 layer ISO IP transmission protocol.

Figure 3:
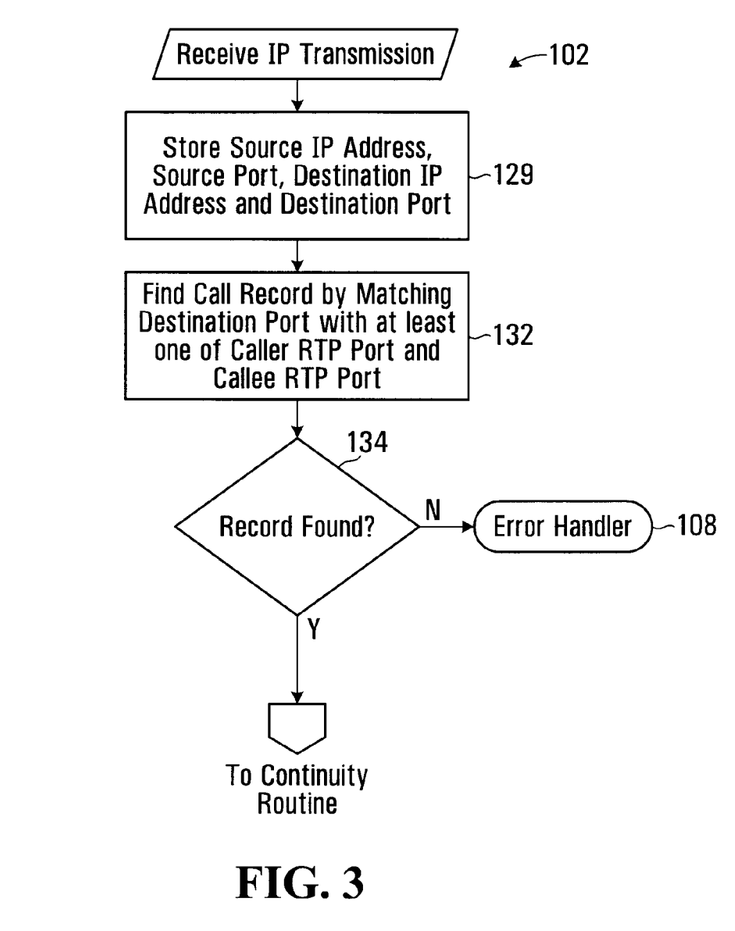
FIG. 3 is a flow chart of an authentication routine executed by a processor of a media relay shown in the system shown in FIG. 1.

Referring to FIG. 3, the functionality of the authentication routine is shown generally at 102. Before describing this routine, however, please refer to FIG. 4 which describes the generic nature of an IP transmission and the important fields of that transmission for effecting the use of the methods described herein.

Figure 4:
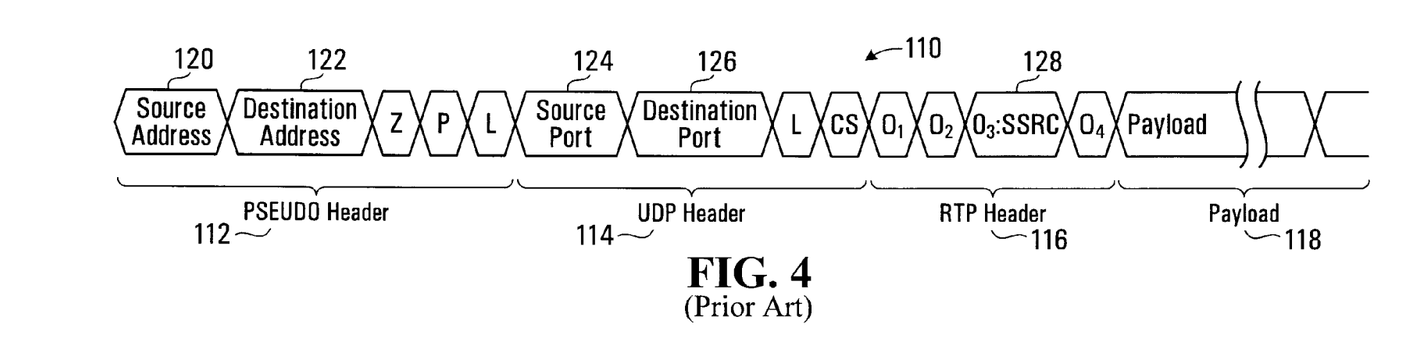
FIG. 4 is a schematic representation of an internet protocol (IP) transmission according to the prior art.

In FIG. 4, an IP transmission is shown generally at 110 and includes a PSEUDO header 112, a UDP header 114, a RTP header 116, and a payload 118. The PSEUDO header 112 includes various fields, the most important of which, in this embodiment, are source IP address identifier and destination address identifier fields 120 and 122 respectively. The UDP header 114 includes source port and destination port identifier fields 124 and 126 and the RTP header 116 includes a SSRC identifier field 128. The payload 118 includes data representing, in this embodiment, audio and/or video data transmitted between the caller and the callee.

Referring back to FIG. 3, the authentication routine 102 is executed in response to receipt of an IP transmission 110 at either the caller RTP port R22125 of the media relay 40 or at the callee RTP port E22123 of the media relay. In response to receipt of an IP transmission 110 at either of these ports, the processor 52 of the media relay 40 is directed to store the source IP address contained in the source IP address identifier field 120, the source port identifier contained in the source port identifier field 124, the destination IP address contained in the destination IP address identifier field 122 and the destination port identifier contained in the destination port identifier field 126 in fields by the same name in a buffer memory 130 addressable by the processor 52. The low level processing routine codes 100 will perform the necessary functions to cleanly extract this information and in this embodiment, the storing of this information is effected by the authentication routine 102, as shown at 129. Alternatively, the low level processing routine codes 100 may store this information directly in the buffer memory 130. It will be appreciated that the buffer memory 130 may include separately addressable fields storing the respective information.

Figure 5:
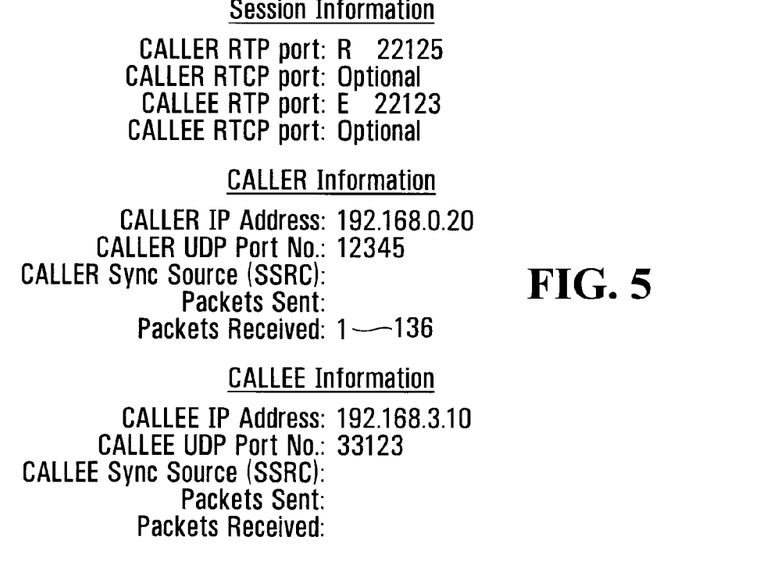
FIG. 5 is a tabular representation of the call record shown in FIG. 2 as updated after receipt of an IP transmission at a caller port of the media relay shown in FIG. 1.

Referring to FIG. 5, upon completion of the execution of block 129 or the low level processing routine codes 100, the call record 60 is updated with the number of packets received as shown at 136 where it is indicated that one packet has been received from the callee, for example.

Referring back to FIG. 3, the authentication routine 102 further includes a block 132 that directs the processor 52 to find a call record such as shown at 60 in the memory 54 by matching the destination port identifier with at least one of the contents of the caller RTP port identifier field 74 and the contents of the callee RTP port identifier field 84 of any of the call records. To do this, the codes in block 132 may direct the media relay processor 52 to scan through all of the caller RTP port identifier fields and callee RTP port identifier fields of all of the call records 60 to find a match with the destination port identifier stored in the buffer memory 130.

Referring to FIG. 3, block 134 directs the processor 52 to invoke an error handler as shown at 108 if no record is found and to proceed to execute the code 104 associated with the continuity routine if a record is found.

Figure 6:
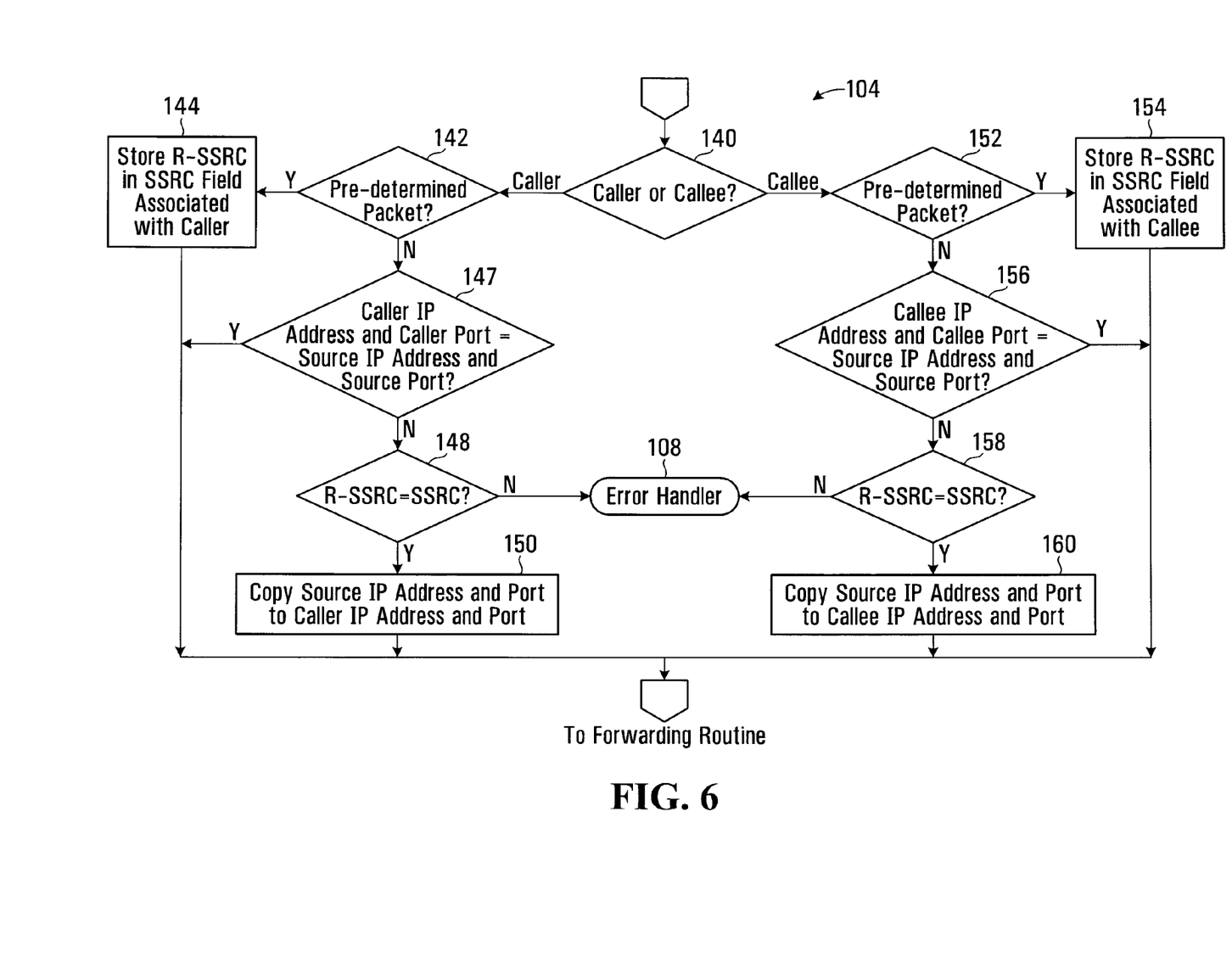
FIG. 6 is a flow chart of a continuity routine executed by the processor of the media relay shown in FIG. 1.

Referring to FIG. 6, the continuity routine 104 begins with a first block 140 which directs the processor 52 to determine whether or not the IP transmission 110 has been received at the caller RTP port or the callee RTP port.

The identification of whether or not the IP transmission 110 is from the caller or callee can occur in a number of ways. One way, for example, is for the processor 52 to be responsive to interrupt signals that may be produced by the input/output interface circuitry 41 that physically implements the interface between the media relay 40 and the internet. Since the caller RTP port and callee RTP port have different port identifiers, the input/output interface circuitry 41 may identify the port which has received an IP transmission 110 and cause an interrupt signal and perhaps an interrupt handler (not shown) to be executed by the processor 52 in order to identify the specific port which has received the IP transmission 110.

Alternatively, when the processor 52 identifies the call record 60 by matching the destination port identifier received from the IP transmission 110 with at least one of the caller RTP port identifier and callee RTP port identifier in a call record, the matching RTP port identifier is inherently identified and this information can be used to identify the specific port that has received the IP transmission 110. A flag (not shown) may be set for example, to identify whether the IP transmission 110 is from the caller or callee, depending on whether there is a match of the destination port identifier with the callee or caller RTP identifier. Thus, if there is a match of the destination port identifier with the callee RTP port identifier, then the source must be the caller and if there is a match of the destination port identifier with the caller RTP port identifier, then the source must be the callee.

Thus, if a flag is used, block 140 can simply cause the processor 52 to read the flag to determine whether or not the IP transmission 110 is received from the caller or callee.

Assuming the IP transmission 110 is received from the caller, optionally, block 142 can direct the processor 52 to determine whether or not a pre-determined packet has been received. In this embodiment, the pre-determined packet is the first packet and thus can be determined by simply reading the contents of the packets received field 80 in the caller information 64 of the call record 60 identified at block 132 of the authentication routine 102. Alternatively, the low level processing codes 100 may have previously stored the number of packets received in some other location readable by the processor 52 for use at this stage.

Figure 7:
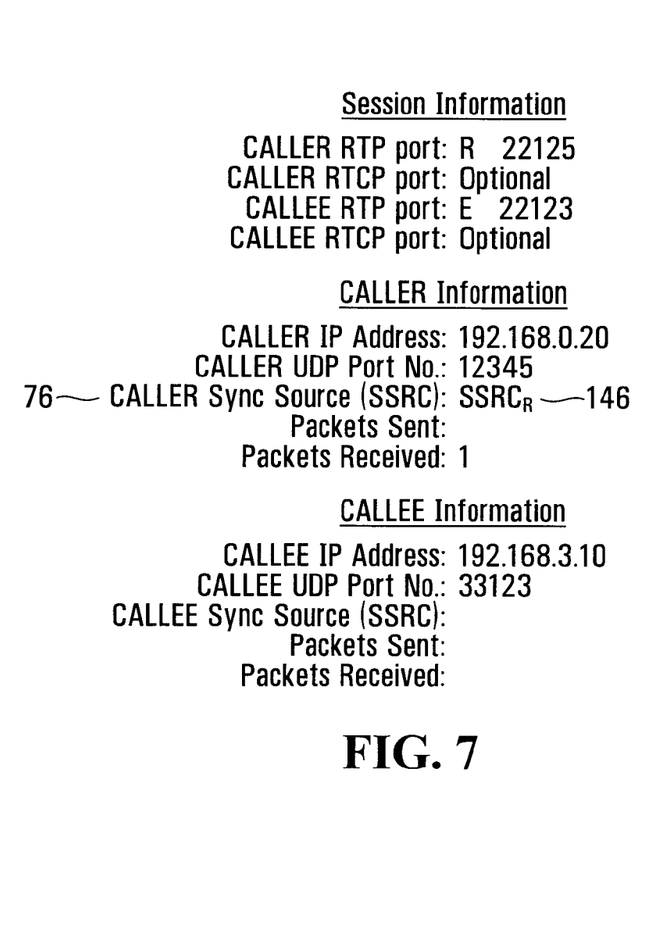
FIG. 7 is a tabular representation of the call record as updated after execution of the continuity routine shown in FIG. 6 when a pre-determined packet is received in the IP transmission.

In this embodiment, the first packet received from the caller is the pre-determined packet and thus, when the first packet is received, block 144 directs the processor 52 to store the SSRC identifier received in the IP transmission 110 in the caller SSRC field 76 associated with the caller information 64 of the call record 60 as shown at 146 in FIG. 7. The processor 52 is then directed to the forwarding routine 106. If at block 142, the IP transmission 110 includes a packet that is not the pre-determined packet, in particular, a packet received subsequent to the pre-determined packet, or where there will be no determination as to whether the received packet is a pre-determined packet, block 147 directs the processor 52 to determine whether the caller IP address identifier and caller port identifier in the caller information 64 of the call record 60 match the source IP address identifier and source port identifier received in the IP transmission 110. If so, the IP transmission 110 has been received from the pre-established source (in this embodiment, the first base station 24) and therefore, the processor 52 is directed to the forwarding routine 106.

If at block 147 the caller IP address identifier and caller port identifier do not match the source IP address identifier and source port identifier, then the IP transmission 110 is deemed to be originating from a different source (i.e. the third base station 50) in which case block 148 directs the processor 52 to determine whether or not the IP transmission is associated with the call represented by the call record 60. To do this, block 148 directs the processor 52 to determine whether the SSRC identifier received in the IP transmission 110 matches the caller SSRC identifier stored in the caller sync source field 76 of the call record 60 shown in FIG. 7. If not, the processor 52 is directed to an error handling routine 108.

Figure 8:
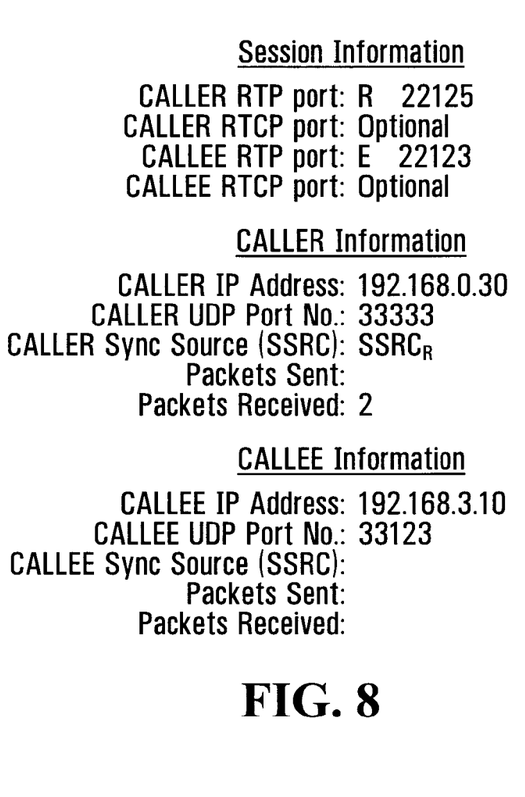
FIG. 8 is a tabular representation of the call record shown in FIG. 7 further updated by the continuity routine after an IP transmission received subsequent to the pre-determined packet is received.

If the SSRC received in the IP transmission 110 matches the caller SSRC stored in the caller sync source field 76 of the call record 60, block 150 directs the processor 52 to copy the source IP address identifier and source port identifier respectively to the caller IP address identifier and caller UDP port identifier fields 72 and 74 respectively of the call record 60 to update the call record to identify the IP address and UDP port of the third base station 50 as that of the caller, as shown in FIG. 8. The processor 52 is then directed to the call forwarding routine 106.

Thus, in an IP transmission 110 received subsequent to the pre-determined transmission, or where there is no determination of whether the transmission is a pre-determined one, the source IP address identifier and source port identifier from the IP transmission 110 are set as the caller IP address identifier and caller port identifier respectively of the call record 60 when the caller IP address identifier and caller port identifier of the record do not match the source IP address identifier and source port identifier respectively of the IP transmission 110 and the received SSRC in the IP transmission matches the caller SSRC identifier of the call record.

Similarly, blocks 152, 154, 156, 158, and 160 function to perform similar functionality when the destination port identifier in the IP transmission 110 matches the callee RTP port identifier of the identified call record 60. In this case where there is a determination of whether the transmission is a pre-determined one, if the IP transmission is the pre-determined transmission, the SSRC identifier received in the IP transmission 110 is set as the callee SSRC identifier associated with the callee information 66 of the record 60 and if the IP transmission is received subsequent to the pre-determined transmission, or where there is no determination of whether the transmission is a pre-determined one, the source IP address identifier and source port identifier from the IP transmission are set as the callee IP address identifier and callee port identifier respectively of the record when the callee IP address identifier and callee port identifier do not match the source IP address identifier and source port identifier respectively and the received SSRC identifier in the IP transmission matches the callee SSRC identifier.

Figure 9:
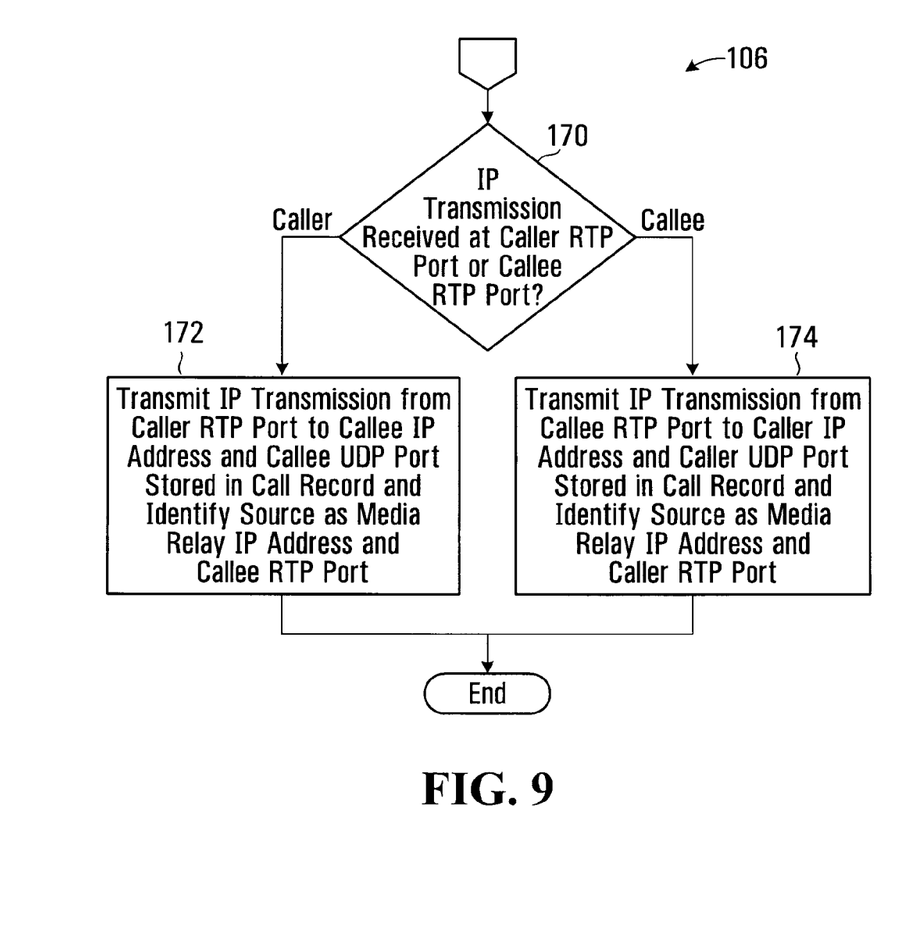
FIG. 9 is a flow chart of a forwarding routine executed by the processor of the media relay shown in FIG. 1 to relay the received IP transmission to a caller or callee with a source identification provided by the call record as updated by the continuity routine shown in FIG. 6.

Referring to FIG. 9, the forwarding routine is shown generally at 106. The forwarding routine includes a first block 170 that directs the processor 52 to again determine whether or not the IP transmission 110 has been received at the caller RTP port or callee RTP port. Again, this may be determined by reading the flag described above or by simply reading a memory location identifying the RTP port that received the IP transmission 110.

If the IP transmission 110 has been received at the caller RTP port, block 172 directs the processor 52 to transmit the IP transmission from the caller RTP port to the callee IP address and callee UDP port identified by the callee IP address identifier and callee UDP port identifier in the call record 60 and to identity the source IP address and source port of the IP transmission as the media relay IP address and callee RTP port. If on the other hand, the IP transmission 110 was received at the callee RTP port, block 174 directs the processor 52 to transmit the IP transmission from the callee RTP port to the caller IP address identified by the caller IP address identifier and caller UDP port identifier stored in the call record 60 and identify the source IP address and source port of the IP transmission as the media relay IP address and caller RTP port. The IP transmission 110 received at either port is thus relayed by the media relay 40 according to the contents of the call record 60 as previously established by the continuity routine 104 shown in FIG. 6.

It will be appreciated that in this embodiment, the IP transmissions 110 received from the caller and from the callee may have different SSRC identifiers. Alternatively, they may have the same SSRC identifiers.

What is claimed is:

1. A method for facilitating uninterrupted transmission of internet protocol (IP) transmissions containing real time transport protocol (RTP) data during endpoint changes, the method comprising:
maintaining records, each record associating session information, caller information and callee information for a respective IP communication session;
said session information including caller and callee RTP port identifiers identifying a caller RTP port and a callee RTP port respectively of a media relay through which IP transmissions of the IP communication session are relayed;
said caller information including a caller IP address identifier and a caller port identifier to which IP transmissions received at said callee RTP port are transmitted from the media relay, and a caller synchronization source (SSRC) identifier; and
said callee information including a callee IP address identifier and a callee port identifier to which IP transmissions received at said caller RTP port are transmitted from the media relay, and a callee SSRC identifier; and
when an IP transmission is received at said caller RTP port or said callee RTP port:
locating one of said records having said caller RTP port identifier or said callee RTP port identifier matching a destination port identifier in said IP transmission; and
a) when said one of said records is located and when said destination port identifier in said IP transmission matches the caller RTP port identifier of said one of said records,
setting a source IP address identifier and source port identifier from said IP transmission as the caller IP address identifier and caller port identifier respectively of said one of said records when:
said caller IP address identifier and caller port identifier do not match said source IP address identifier and source port identifier respectively; and
a received SSRC identifier in said IP transmission matches said caller SSRC identifier; and
b) when said one of said records is located and when said destination port identifier in said IP transmission matches the callee RTP port identifier of said one of said records,
setting said source IP address identifier and source port identifier from said IP transmission as the callee IP address identifier and callee port identifier respectively of said one of said records when:
said callee IP address identifier and callee port identifier do not match said source IP address identifier and source port identifier respectively; and
said received SSRC identifier in said IP transmission matches said callee SSRC identifier.

2. The method of claim 1 further comprising determining whether said IP transmission is a pre-determined transmission and, if so, determining whether the IP transmission is from the caller or callee; and
when the pre-determined IP transmission is received from the caller, storing said received SSRC identifier as the caller SSRC identifier in said one of said records; and
when the pre-determined IP transmission is received from the callee, storing said received SSRC identifier as the callee SSRC identifier in said one of said records.

3. The method of claim 1 further comprising determining whether said IP transmission is a pre-determined transmission and, if so, where the caller and callee are configured to use the same SSRC identifier, storing the received SSRC identifier as the caller SSRC identifier in said one of said records and as the callee SSRC identifier in said one of said records.

4. The method in claim 1 further comprising:
if the IP transmission was received at the caller RTP port, causing the media relay to forward the IP transmission to the callee at the callee IP address and callee port identified by the callee IP address identifier and callee port identifier of the record and identifying the source of said IP transmission forwarded to the callee with the callee RTP port identifier; and
if the IP transmission was received at the callee RTP port, causing the media relay to forward the IP transmission to the caller at the caller IP address and caller port identified by the caller IP address identifier and caller port identifier of the record and identifying the source of said IP transmission forwarded to the caller with the caller RTP port identifier.

5. A media relay apparatus for facilitating uninterrupted transmission of internet protocol (IP) transmissions containing real time transport protocol (RTP) data during endpoint changes, the apparatus comprising:
a processor;
input/output interfaces in communication with the processor to provide for connection to an IP network;
non-transitory program memory and storage memory, said program memory encoded with computer executable codes for directing the processor to:
provide a logical input/output interface interacting with said input/output interfaces to define caller and callee RTP ports;
maintain call records in said storage memory, each said call record having fields associating session information, caller information and callee information for a respective IP communication session;
said fields associating session information including caller and callee RTP port identifier fields identifying a caller RTP port and a callee RTP port respectively, through which IP transmissions of the IP communication session are relayed;

said caller information including a caller IP address identifier field and a caller port identifier field to which IP transmissions received at the callee RTP port are to be transmitted, and a caller synchronization source (SSRC) identifier field; and said callee information including a callee IP address identifier field and a callee port identifier field to which IP transmissions received at said caller RTP port are to be transmitted, and a callee SSRC identifier field; and to locate one of said records having said caller RTP port identifier field contents or said callee RTP port identifier field contents matching a destination port identifier in said IP transmission when an IP transmission is received at a caller RTP port or a callee RTP port;

when said one of said records is located and when said destination port identifier in said IP transmission matches the contents of the caller RTP port identifier field of said one of said records, storing a source IP address identifier and source port identifier from said IP transmission in the caller IP address identifier field and caller port identifier field respectively when:

the contents of said caller IP address field and caller port identifier field do not match said source IP address identifier and source port identifier respectively; and a received SSRC identifier in said IP transmission matches the contents of said caller SSRC identifier field; and when said one of said records is located and when said destination port identifier in said IP transmission matches the contents of the callee RTP port identifier field of said one of said records, storing said source IP address identifier and source port identifier from said IP transmission in the callee IP address identifier field and callee port identifier field respectively when:

said contents of said callee IP address identifier field and said callee port identifier field do not match said source IP address identifier and source port identifier respectively; and said received SSRC identifier in said IP transmission matches the contents of said callee SSRC identifier field.

6. The apparatus of claim 5 wherein said program memory is further encoded with computer executable codes for directing the processor to determine whether said IP transmission is a pre-determined transmission and, if so, determine whether the IP transmission is from the caller or callee; and when the pre-determined IP transmission is received from the caller, store said received SSRC identifier in the caller SSRC identifier field in said one of said records; and when the pre-determined IP transmission is received from the callee, store said received SSRC identifier in the callee SSRC identifier field in said one of said records.

7. The apparatus of claim 5 further comprising determining whether said IP transmission is a pre-determined transmission and, if so, where the caller and callee are configured to use the same SSRC, storing the received SSRC in the caller SSRC identifier field in said one of said records and in the callee SSRC identifier field in said one of said records.

8. The apparatus of claim 5 wherein said program memory is further encoded with computer executable codes for directing the processor to: when the IP transmission is received at the caller RTP port, forward the IP transmission to the callee identified by the contents of the callee IP address identifier field and the callee port identifier field and identify the source of said IP transmission according to the contents of the callee RTP port identifier field; and when the IP transmission is received at the callee RTP port, forward the IP transmission to the caller identified by the contents of the caller IP address identifier field and the caller port identifier field and identify the source of said IP transmission according to the contents of the caller RTP port identifier field.

9. A media relay apparatus for facilitating uninterrupted transmission of Internet protocol (IP) transmissions containing real time transport protocol (RTP) data during endpoint changes, the apparatus comprising:

a processor;

physical connection means for providing physical connections between the processor and an IP network;

means for interacting with said physical connection means and said processor for providing a logical input/output interface defining caller and callee RTP ports;

means for maintaining call records in memory, each of said call records having means for associating session information, caller information and callee information for a respective IP communication session including:

means for storing caller and callee RTP port identifiers identifying a caller RTP port and a callee RTP port respectively through which IP transmissions of the IP communication session are relayed;

means for storing a caller IP address identifier and a caller port identifier to which IP transmissions received at said callee RTP port are to be transmitted from the media relay apparatus;

means for storing a caller synchronization source (SSRC) identifier;

means for storing a callee IP address identifier and a callee port identifier identifying the callee RTP port to which IP transmissions received at said caller RTP port are to be transmitted from the media relay apparatus; and means for storing a callee SSRC identifier; and means for locating one of said records having a caller RTP port identifier or a callee RTP port identifier matching a destination port identifier in an IP transmission when the IP transmission is received at a caller RTP port or a callee RTP port;

means for determining whether said destination port identifier in said IP transmission matches the caller RTP port identifier of said one of said records;

means for setting the caller IP address identifier and caller port identifier as the source IP address identifier and source port identifier respectively from said IP transmission when:

said caller IP address identifier and caller port identifier do not match said source IP address identifier and source port identifier respectively; and a received SSRC identifier in said IP transmission matches said caller SSRC identifier; and means for determining whether said destination port identifier in said IP transmission matches the callee RTP port identifier of said one of said records, and means for setting the callee IP address identifier and callee port identifier as the source IP address identifier and source port identifier respectively from said IP transmission when:

said callee IP address identifier and said callee port identifier do not match said source IP address identifier and source port identifier respectively; and said received SSRC identifier in said IP transmission matches said callee SSRC identifier.

10. The apparatus of claim 9 further comprising means for determining whether said IP transmission is a pre-determined transmission and, if so, determining whether the IP transmission is from the caller or callee; and
  means for storing said received SSRC identifier as the caller SSRC identifier when the pre-determined IP transmission is received from the caller; and
  means for storing said received SSRC identifier as the callee SSRC identifier when the pre-determined IP transmission is received from the callee.

11. The apparatus of claim 9 further comprising means for determining whether said IP transmission is a pre-determined transmission and means for storing the received SSRC identifier as the caller SSRC identifier and as the callee SSRC identifier, where the caller and callee are configured to use the same SSRC.

12. The apparatus of claim 9 further comprising: means for forwarding the IP transmission to the callee identified by the callee IP address identifier and the callee port identifier and for identifying the source of said IP transmission with the callee RTP port identifier when the received IP transmission was received at the caller RTP port; and means for forwarding the IP transmission to the caller identified by the caller IP address identifier and caller port identifier and for identifying the source of said IP transmission with the caller RTP port identifier when the received IP transmission was received at the callee RTP port.

13. A non-transitory computer readable medium encoded with computer executable codes for directing a processor of a media relay to facilitate uninterrupted transmission of internet protocol (IP) transmissions containing real time transport protocol (RTP) data during endpoint changes, the codes comprising computer executable codes for directing the processor to:
  maintain records, each record associating session information, caller information and callee information for a respective IP communication session;
    said session information including a caller RTP port identifier and a callee RTP port identifier identifying caller and callee RTP ports respectively of the media relay through which IP transmissions of the IP communication session are relayed;
  said caller information including a caller IP address identifier and a caller port identifier to which IP transmissions received at said callee RTP port are transmitted from the media relay, and a caller synchronization source (SSRC) identifier; and
  said callee information including a callee IP address identifier and a callee port identifier to which IP transmissions received at said caller RTP port are transmitted from the media relay, and a callee SSRC identifier; and
  when an IP transmission is received at said caller RTP port or said callee RTP port:
    locate one of said records having said caller RTP port identifier or said callee RTP port identifier matching a destination port identifier in said IP transmission;
    when said one of said records is located and when said destination port identifier in said IP transmission matches the caller RTP port identifier of said one of said records,
      set a source IP address identifier and source port identifier from said IP transmission as the caller IP address identifier and caller port identifier respectively of said one of said records when:
        said caller IP address identifier and caller port identifier do not match said source IP address identifier and source port identifier respectively; and
        a received SSRC identifier in said IP transmission matches said caller SSRC identifier; and
    when said one of said records is located and when said destination port identifier in said IP transmission matches the callee RTP port identifier of said one of said records,
    set said source IP address identifier and source port identifier from said IP transmission as the callee IP address identifier and callee port identifier respectively of said one of said records when:
      said callee IP address identifier and callee port identifier do not match said source IP address identifier and source port identifier respectively; and
      said received SSRC identifier in said IP transmission matches said callee SSRC identifier.

14. The computer readable medium of claim 13 wherein said computer executable codes further include computer executable codes for directing the processor to determine whether said IP transmission is a pre-determined transmission and, if so, determine whether the IP transmission is from the caller or callee; and when the pre-determined IP transmission is received from the caller, store said received SSRC identifier as the caller SSRC identifier in said one of said records; and when the pre-determined IP transmission is received from the callee, store said received SSRC identifier as the callee SSRC identifier in said one of said records.

15. The computer readable medium of claim 13 further comprising computer executable codes for directing the processor to determine whether said IP transmission is a pre-determined transmission and, if so, where the caller and callee are configured to use the same SSRC identifier, store the received SSRC identifier as the caller SSRC identifier in said one of said records and as the callee SSRC identifier in said one of said records.

16. The computer readable medium of claim 13 further comprising computer executable codes for directing the processor to:
  if the IP transmission was received at the caller RTP port, cause the media relay to forward the IP transmission to the callee at the callee IP address and callee port identified by the callee IP address identifier and callee port identifier respectively and identify the source of said IP transmission forwarded to the callee with the callee RTP port identifier; and
  if the IP transmission was received at the callee RTP port, cause the media relay to forward the IP transmission to the caller at the caller IP address and caller port identified by the caller IP address identifier and caller port identifier respectively and identify the source of said IP transmission forwarded to the caller with the caller RTP port identifier.

* * * * *